(12) United States Patent
Herriot (10) Patent No.: US 10,734,919 B2
(45) Date of Patent: Aug. 4, 2020

(54) TRANSFORMER ELECTRICAL CIRCUIT AND INSTALLATION COMPRISING SUCH A CIRCUIT

(71) Applicant: SCHNEIDER ELECTRIC INDUSTRIES SAS, Rueil Malmaison (FR)

(72) Inventor: Yann Herriot, Voiron (FR)

(73) Assignee: SCHNEIDER ELECTRIC INDUSTRIES SAS, Rueil Malmaison (FR)

(*) Notice: Subject to any disclaimer, the term of this patent is extended or adjusted under 35 U.S.C. 154(b) by 0 days.

(21) Appl. No.: 16/020,687

(22) Filed: Jun. 27, 2018

(65) Prior Publication Data

US 2019/0006956 A1 Jan. 3, 2019

Related U.S. Application Data

(63) Continuation of application No. 14/877,140, filed on Oct. 7, 2015.

(30) Foreign Application Priority Data

Oct. 8, 2014 (FR) ...................... 14 59661

(51) Int. Cl.
*H02M 7/5387* (2007.01)
*H02M 7/48* (2007.01)

(52) U.S. Cl.
CPC ..... *H02M 7/53871* (2013.01); *H02M 7/4807* (2013.01)

(58) Field of Classification Search
CPC .......... H02M 7/53871; H02M 7/4807; H02M 3/335; H02M 7/72; H02M 3/33584; H02M 2001/007; H01F 19/02; H02J 3/04

(Continued)

(56) References Cited

U.S. PATENT DOCUMENTS

| 5,764,402 A | 6/1998 | Thomas |
| 6,418,038 B2 | 7/2002 | Takahama |

(Continued)

FOREIGN PATENT DOCUMENTS

| WO | WO 2008/116042 A2 | 9/2008 |
| WO | WO 2012/162581 A1 | 11/2012 |

OTHER PUBLICATIONS

Received STIC search report from EIC 2800 searcher Mesfin Getaneh on Oct. 15, 2018.*

(Continued)

*Primary Examiner* — Emily P Pham
*Assistant Examiner* — Htet Z Kyaw
(74) *Attorney, Agent, or Firm* — Oblon, McClelland, Maier & Neustadt, L.L.P.

(57) ABSTRACT

An electric transformer circuit for connecting electrical equipment, such as a renewable energy-based generator or an energy storage system, to an electric grid. The circuit includes a first voltage converter connected to the equipment; a transformer connected to the first converter and a second voltage converter connected to the transformer and the electric grid. The transformer is a weakly coupled transformer, the magnetic coupling between the first coil and the second coil being less than 0.7. The transformer includes a first and second capacitor respectively associated with a first and second coil so as to form, with the corresponding coil, a circuit resonating at frequency f0. The electric transformer circuit can be included in an electric installation.

20 Claims, 6 Drawing Sheets

(58) Field of Classification Search
USPC .......... 363/71, 131, 132, 159, 163; 307/151; 327/530
See application file for complete search history.

(56) References Cited

U.S. PATENT DOCUMENTS

| | | |
|---|---|---|
| 6,934,167 B2 | 8/2005 | Jang |
| 8,223,508 B2 | 7/2012 | Baarman |
| 8,670,254 B2 | 3/2014 | Perreault |
| 9,444,367 B2 | 9/2016 | Fornage |
| 2002/0191420 A1 | 12/2002 | Tolle |
| 2006/0268587 A1 | 11/2006 | Veenstra |
| 2009/0086520 A1 | 4/2009 | Nishimura |
| 2009/0201706 A1 | 8/2009 | Zacharias |
| 2009/0322307 A1 | 12/2009 | Ide |
| 2011/0181128 A1 | 7/2011 | Perreault |
| 2012/0043930 A1 | 2/2012 | Scudiere |
| 2013/0049674 A1 | 2/2013 | Davis |
| 2014/0268898 A1 | 9/2014 | Zimmanck |
| 2014/0327308 A1 | 11/2014 | Cargile |
| 2015/0097522 A1 | 4/2015 | Herriot |
| 2015/0263526 A1 | 9/2015 | Kjaer |
| 2015/0311827 A1 | 10/2015 | Villalobos |
| 2015/0333634 A1 | 11/2015 | Yoshida |
| 2016/0059713 A1 | 3/2016 | Herriot |
| 2016/0105119 A1 | 4/2016 | Akamatsu |

OTHER PUBLICATIONS

Received STIC search report from EiC 2800 searcher Benjamin Martin on Sep. 27, 2016.
A. Trubitsyn, B. J. Pierquet, A. K. Hayman, G. E. Garnache, C. R. Sullivan and D. J. Perreault, "High-efficiency inverter for photovoltaic applications," 201 O IEEE Energy Conversion Congress and Exposition, Atlanta, GA, 2010, pp. 2803-2810.
French Preliminary Search Report dated May 18, 2015 in French Application 14 59661; filed on Oct. 8, 2014 (with English Translation of Categories of Cited Documents).

* cited by examiner

TRANSFORMER ELECTRICAL CIRCUIT AND INSTALLATION COMPRISING SUCH A CIRCUIT

CROSS REFERENCE TO RELATED APPLICATION

This application is a continuation of U.S. patent application Ser. No. 14/877,140, filed Oct. 7, 2015, which claims priority to French Patent Application No. 14 59661, filed Oct. 8, 2014, the entire content and disclosure of each of which is incorporated by reference into the present application.

DESCRIPTION

Technical Field

The invention relates to the field of the connection of electrical equipment to electric grids, irrespective of the type of the electrical equipment. This type of electrical equipment may either be of the electrical charge type, such as batteries, or the electrical power supply type, such as renewable energy generators, or may be of a type working by alternating a charge and an electric power supply, such as certain batteries or supercapacitors.

Background of the Invention

The connection of an electrical equipment, irrespective of its type, to an electric grid having an operating voltage different from that of the electrical equipment generally requires a suitable electric transformer circuit.

Indeed, whether it is to provide power to the electrical equipment or for the electrical equipment to transmit electricity to the grid, a voltage adaptation and/or galvanic insulation is necessary. This is even more true when the equipment is equipment operating with a DC voltage and the electric grid operates with an AC voltage. This type of transformer circuit is therefore highly necessary in the development of renewable energy equipment such as wind turbines, photovoltaic sensors or energy storage stations associated with renewable energy generators.

Figure 1:
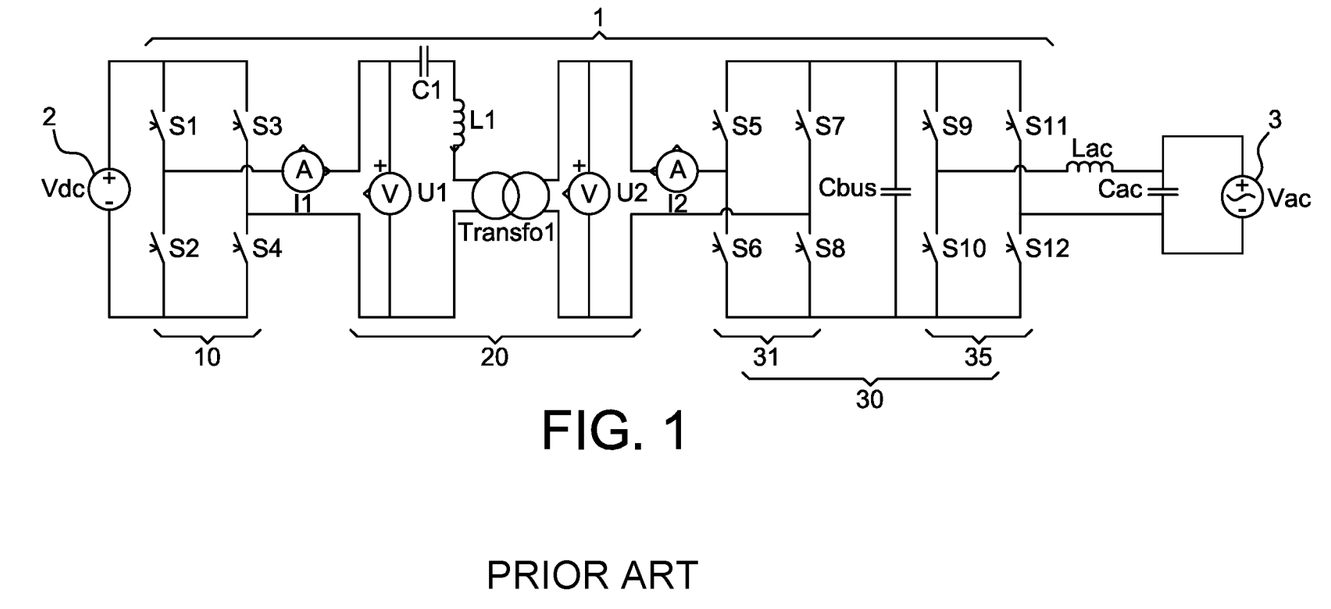
FIG. 1 diagrammatically shows an example electric transformer circuit for connecting an electrical equipment to an electric grid according to the prior art, FIG. 2 diagrammatically illustrates an electric transformer circuit according to the invention connecting an electrical equipment to an electric grid.

In the latter case, i.e., the connection of electrical equipment working with a DC voltage to an electric grid with an AC voltage with frequency f2, an electric transformer circuit includes, as illustrated in FIG. 1:
  a first voltage converter 10 suitable for connecting the electrical equipment 2 to part of the electric circuit 20 operating with an AC voltage with frequency f0, the first converter 10 being an inverter in the event the electrical equipment 2 is a charge and an AC/DC voltage converter in the case where the electrical equipment 2 is an electricity power supply,
  a transformer 20 connected to the first voltage converter and configured to adapt the amplitude of the AC voltage with frequency f0 of the first converter 10 relative to the amplitude of the voltage of the electric grid 3, said transformer 20 including a primary coil connected to the first converter 10 and a secondary coil, said primary and secondary coils being arranged secured in movement, said transformer possibly being completed by a resonating circuit 21, placed on the primary or secondary side,
  a second converter 30 connected to the secondary coil suitable for connecting the secondary coil to the electric grid 3.

The second converter 30, in order to separate the frequency f0 from that of the circuit of the electric grid 3, includes an inverter and an AC/DC voltage converter operating, in the case illustrated in FIG. 1, on the switching mode principle. Thus, in the case where the electrical equipment 2 is an electric charge, the second converter 30 comprises an inverter 31 connected to the secondary coil of the transformer 20 and an AC/DC voltage converter 35 connecting the inverter to the electric grid 3. In the event the electrical equipment 2 is a generator, the second converter 30 comprises an AC/DC voltage converter connected to the secondary coil of the transformer and an inverter connecting the AC/DC voltage converter to the electric grid 3.

It should be noted that such a circuit may also be adapted to electrical equipment that may be an electric charge and electric power supply in turn, such as batteries, by using a bidirectional first and second converter.

Here and in the rest of the document, electrical equipment refers both to equipment of the voltage power supply type, such as one or more photovoltaic panels or a wind turbine equipped with a rectifier stage, and electric charge equipment, such as a heating system for one or more photovoltaic panels, or equipment that may in turn act as a power supply or electric charge, such as an energy storage system (for example, batteries connected to one another).

In order to optimize the performance of the transformer and limit the disruptions caused by the signal conversions both at the electrical equipment and the electric grid, it is preferable for the frequency f0 of the transformer to be much higher than the frequency of the electric grid f2. Nevertheless, the frequencies f0 that can be achieved by such a transformer of the prior art encounter certain technological and cost-based limitations.

Indeed, the transformer must both provide a good transformation performance while also ensuring good galvanic insulation between the electrical equipment and the electric grid, with a reasonable dimension of the transformer. For these reasons, such circuits are limited to frequencies of approximately a kilohertz and therefore have a limited compactness and transformation performance.

BRIEF DESCRIPTION OF THE INVENTION

The invention aims to resolve these drawbacks, and thus more particularly aims to provide an electric transformer circuit to connect electrical equipment to an electric grid which, while retaining reasonable dimensions, can offer good conversion performance and good galvanic insulation with a high operating frequency.

To that end, the invention relates to an electric transformer circuit for connecting electrical equipment, such as a renewable energy-based generator or an energy storage system, to an electric grid, said circuit including:
  a first voltage converter suitable for connecting the electrical equipment to part of the electric circuit operating with an AC voltage with frequency f0,
  a transformer connected to the first voltage converter and configured to perform an amplitude adaptation between the voltage of the electrical equipment and that of the electric grid, said transformer including a first coil connected to the first converter and a second coil magnetically coupled to the first coil, said first and second coils being arranged secured in movement, the transformer forming the part of the electric circuit working with an AC voltage with frequency f0,
  a second converter configured to connect said second coil to the electric grid.

The transformer is a weakly coupled transformer, the magnetic coupling between the first coil and the second coil being less than 0.7, and the transformer includes a first and second capacitor respectively associated with the first and second coils so as to form, with the corresponding coil, a circuit resonating at frequency f0.

Such an electric transformer circuit has the advantage of making it possible to obtain a transformation at a high frequency that can easily reach around ten kilohertz, with reasonable dimensions and without the galvanic insulation suffering, since it is provided by the use of a weakly coupled transformer. Furthermore, the transformation performance is retained owing to a transformation done at the resonance. Thus, such a circuit can be compact while offering good galvanic insulation and a good transformation performance.

It will additionally be noted that, when the first and second converter are bidirectional, that circuit makes it possible to connect to an electric grid as well as an electric charge-type piece of equipment or an electric power supply-type piece of equipment, and equipment that may act as an electric charge and electric power supply in turn.

The magnetic coupling of the transformer is defined by the following mathematical formula:

$$Kmag = \frac{M}{\sqrt{L1 \times L2}} \quad (1)$$

With M the transformation ratio of the transformer, L1 and L2 being the respective inductance values of the first and second coils the transformer, generally known under the name of primary and secondary coils.

Above and in the rest of the document, an amplitude adaptation between a first and second voltage refers to either:
- in the case where the first and second voltages are both AC voltages, an amplitude adaptation as such,
- in the case where the first voltage is a DC voltage and the second voltage is an AC voltage, an adaptation between the value of the first voltage and the amplitude of the second voltage,
- in the case where the first and second voltages are both DC voltages, a value adaptation between the first and second voltages,
- in the case where the first voltage is an AC voltage and the second voltage is a DC voltage, an adaptation between the amplitude of the first voltage and the value of the second voltage.

Thus, more generally, "amplitude" of a DC voltage refers to its value.

The magnetic coupling between the first coil and the second coil may be approximately or less than 0.5.

The transformer may be a transformer of the air type.

This type of transformer not including a magnetic core between the two coils, the galvanic insulation between the first and second coils may be optimized without a drastic increase in the dimensions of the transformer.

The frequency f0 can be a frequency greater than 1 kHz, preferably greater than 5 kHz, or even greater than 10 kHz.

Such an operating frequency of the transformer makes it possible to provide a good transformation performance.

The electrical equipment may be an electrical equipment working with a DC voltage that is either an electric charge, such as a battery, or an electric power supply, such as a renewable energy-based generator, or both, such as a battery adapted to transmit energy to the electric grid, the first converter being able to be:
- in the case where the electrical equipment is an electric charge, an AC to DC voltage converter with the transformer at the input and the electrical equipment at the output,
- in the case where the electrical equipment is a generator, an inverter with the electrical equipment at the input and the transformer at the output,
- in the case where the electrical equipment can operate both as power supply and charge, an AC voltage to DC voltage bidirectional converter.

The electrical equipment may be an electrical equipment that is either an electric charge, such as a battery, or an electric power supply, such as a renewable energy-based generator, or both, such as a battery suitable for transmitting energy to the electric grid, and wherein the electric grid can be an AC electric grid with frequency f2, the second converter being able to be adapted to:
- in the case where the electrical equipment is an electric charge, convert a voltage with frequency f2 into a voltage with frequency f0, the second converter being connected at the input to the electric grid and at the output to the second coil,
- in the case where the electrical equipment is a generator, convert a voltage with frequency f0 into a voltage f2, the second converter being connected at the input to the second coil and at the output to the electric grid,
- in the case where the electrical equipment can operate both as a power supply and a charge, bidirectionally convert a voltage with frequency f2 into a voltage with frequency f0.

The second converter can comprise a switching regulator system suitable for providing the second coil with an AC voltage with fundamental frequency f0 and proportional to the voltage of the electric grid resulting from a low-pass filter, the command of said switching regulator system being independent from the voltages of the electric grid and the electrical equipment.

Such a switching regulator system makes it possible to provide a simplified second converter, since it does not require a command circuit synchronized with any one of the voltage of the electric grid and the voltage of the electrical equipment.

The electrical equipment may be an electrical equipment that is either an electric charge, such as a battery, or an electric power supply, such as a renewable energy-based generator, or both, such as a battery suitable for transmitting energy to the electric grid, and the electric grid may be a DC voltage electric grid, the second converter being able to be:
- in the case where the equipment is an electric charge, an inverter suitable for providing, from the DC voltage of the electric grid, an AC voltage with frequency f0 to the second coil,
- in the case where the equipment is an electric power supply, converting a voltage with frequency f0 into a DC voltage, the second converter being connected at the input to the second coil and at the output to the electric grid,
- in the case where the electrical equipment can operate both as an electric power supply and an electric charge, suitable for a bidirectional conversion of a DC voltage into an AC voltage with frequency f0.

The second converter may comprise a switching regulator system arranged to connect the electric grid and the second coil only during positive alternations of the AC voltage with frequency f0 and a low-pass filter suitable for at least partially filtering the voltages with frequency f0.

Such a second converter makes it possible to provide an electric circuit suitable for connecting an electric grid to an electrical equipment with an AC transformation voltage with frequency f0.

The invention also relates to an electric installation including:
- an electrical equipment such as a renewable energy-based generator or an energy storage system, and
- an electric transformer circuit connected to the electrical equipment, in order to connect the electrical equipment to an electric grid, the electric circuit being an electric circuit according to the invention.

Such an installation benefits from the advantages provided by circuit according to the invention.

BRIEF DESCRIPTION OF THE DRAWINGS

The present invention will be better understood upon reading the description of example embodiments, provided purely for information and non-limitingly, done in reference to the appended drawings, in which:

FIGS. 4A, 4B and 4C illustrate an example of operating voltages of the electric transformer circuit, where FIG. 4A illustrates the current at the input of the first converter powering the electrical equipment, FIG. 4B more specifically shows the current and voltage at the transformer stage corresponding to the electrical equipment, and FIG. 4C shows the current and voltage at the transformer stage corresponding to the electric grid.

Identical, similar or equivalent parts of the various figures bear the same numerical references so as to facilitate the passage from one figure to the next.

The different possibilities (alternatives and embodiments) must be understood as not being mutually exclusive, and may be combined with one another.

DETAILED DESCRIPTION OF THE INVENTION

Figure 2:
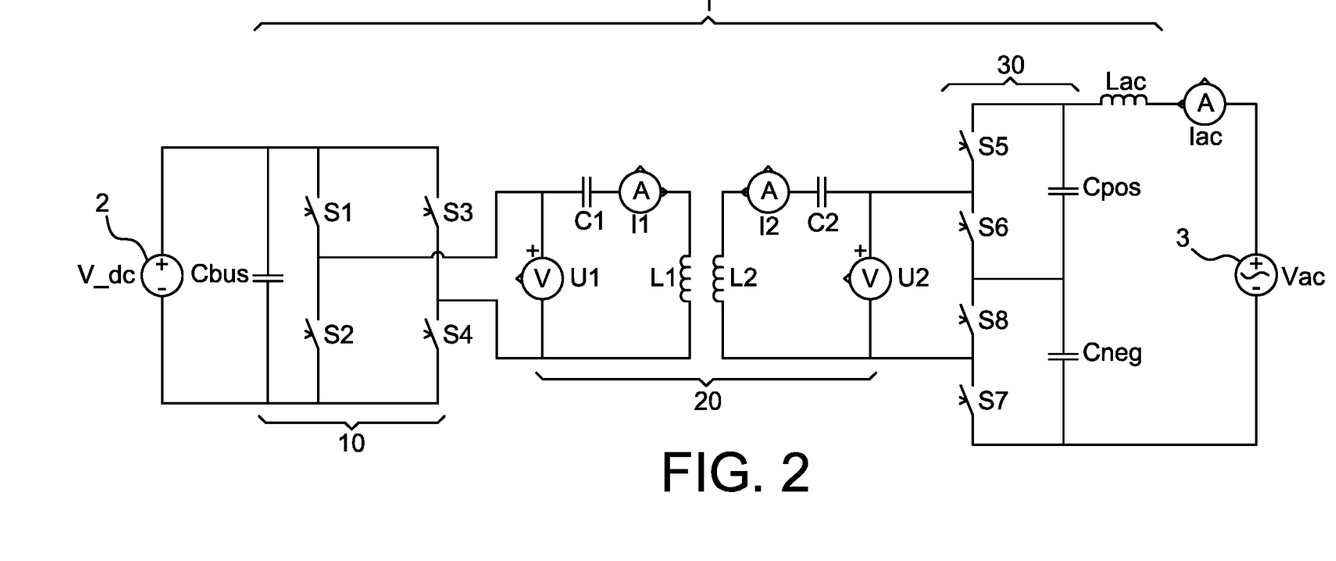

FIG. 2 diagrammatically shows an electric transformer circuit 1 connecting an electrical equipment 2, such as a renewable energy generator or energy storage system, to an electric grid 3.

Such an electric transformer circuit 1 includes:
- a first voltage converter 10 suitable for connecting the electrical equipment 2 to part of the circuit 1 operating with an AC voltage with frequency f0,
- a transformer 20 connected to the first voltage converter 10 and configured to perform an amplitude adaptation between the voltage of the electrical equipment 2 and that of the electric grid 3, said transformer 20 including a first coil L1, connected to the first converter 10, and a second coil L2 magnetically coupled to the first coil L1 and the first and second capacitor C1, C2 respectively associated with the first and second coil L1, L2 so as to form, with the corresponding coil, a circuit resonating at frequency f0,
- a second converter 30 connected to the second coil L2 and to the electric grid 3 and which is configured to connect said second coil L2 to the electric grid 3.

In order to illustrate the different measurement locations for the voltages of the electric circuit 1 and the currents that cross through it, the circuit illustrated in FIG. 2 shows ampermeters I1, I2, Iac and voltmeters U1, U2.

In FIG. 2, the electrical equipment 2 is a DC voltage power supply whose voltage is denoted Vdc. Of course, the circuit illustrated in FIG. 2 being bidirectional, the electrical equipment 2 can also be an electric charge or a power supply and a charge in turn, without going beyond the scope of the invention.

The first converter 10 includes a first capacitance Cbus placed in parallel with the electrical equipment 2 in order to filter the disruptions that the conversion offered by the first converter 10 may induce. The first converter 10 also includes a switching circuit comprising four switches S1, S2, S3, S4 so as to allow an adaptation between the DC voltage of the electrical equipment 2 and the AC voltage frequency f0 of the transformer 20. To do that, the pairs of switches S1/S2 and S3/S4 are opened by alternating at the frequency f0 so as to alternate the polarization of the connection between the electrical equipment 2 and the transformer 20. Such a command of the switches S1 to S4 is traditional to obtain conversions of the DC voltage into an AC voltage, of an AC voltage into a DC voltage, or a bidirectional DC voltage-AC voltage conversion.

The transformer 20 makes it possible to act as an interface between the first and second converters 10, 30 by offering an amplitude adaptation between the voltage of the electrical equipment 2 and the voltage of the electric grid 3. In order to optimize the performance of the circuit 1 while ensuring good galvanic insulation between the electrical equipment and the electric grid, the transformer is a weakly coupled transformer, i.e., the magnetic coupling between the first coil and the second coil is less than 0.7 and may be approximately or even less than 0.5, and the first and second coils are each associated with the corresponding capacitance to form a circuit resonating at frequency f0.

Such a weakly coupled transformer 20 can be obtained by using a transformer of the air type, i.e., not including a magnetic core between the two coils. Thus, the coupling between the first and second coils L1, L2 is done in the "air", since the magnetic core is replaced by an empty space.

Figure 3:
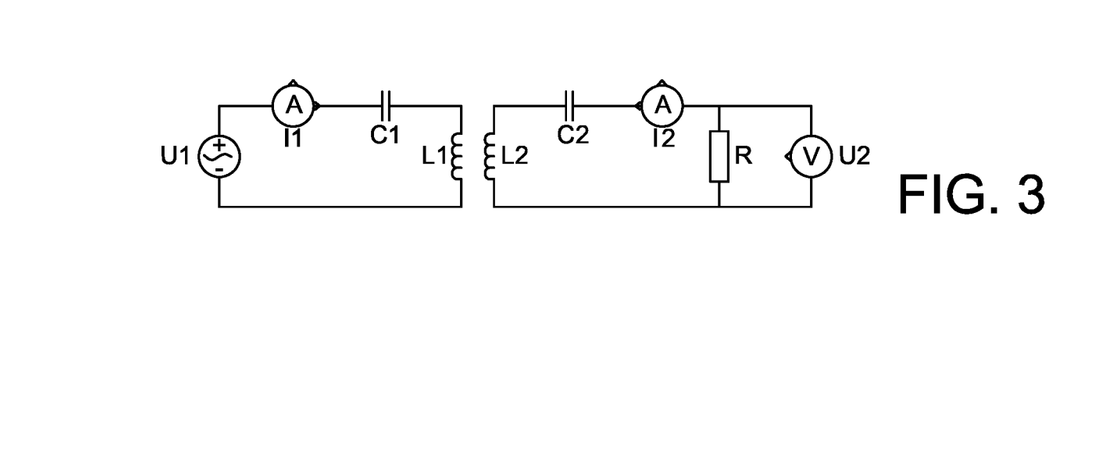
FIG. 3 illustrates a block diagram of the operation of the transformer stage of the electric circuit according to the invention.

The operating principle of the transformer 20 is illustrated in FIG. 3. Indeed, the first coil L1 with the first capacitance C1 forms a first resonating circuit and the second coil L2 with the second capacitance C2 forms a second resonating circuit, those two resonating circuits having resonance frequency f0. Those two circuits must therefore respect the following equation:

$$f0 = \frac{\omega_0}{2\pi} = \frac{1}{2\pi\sqrt{L1 \cdot C1}} = \frac{1}{2\pi\sqrt{L2 \cdot C2}} \quad (2)$$

With f0 the resonance frequency, ω0 the pulse at the resonance, L1, L2 the respective inductances of the first and second coils L1, L2, and C1, C2 the respective capacitances of the first and second capacitance.

Thus, the following relations may be deduced between the voltage U1 and the currents I1 and I2:

$$U1 = I1 \cdot \left(\frac{1}{jC1\omega_0} + jL1\omega_0\right) + j \cdot M\omega_0 \cdot I2 \quad (3)$$

$$I2 = \frac{U1}{j \cdot M\omega_0} \quad (4)$$

As a result, one can see that the transformer works as a current power supply with the amplitude of I2, which can be controlled by U1.

The circuit being symmetrical, the relationships below between the voltage U2 and the currents I1 and I2 can be deduced from relationship (1):

$$U2 = R \cdot I2 = I2 \cdot \left(\frac{1}{jC1\omega_0} + jL1\omega_0\right) + j \cdot M\omega_0 \cdot I1 \quad (5)$$

$$U2 = R \cdot I2 = \frac{U1}{j \cdot M\omega_0} = j \cdot M\omega_0 \cdot I1 \quad (6)$$

$$I1 = \frac{U2}{j \cdot M\omega_0} = -R\frac{U1}{M^2\omega_0^2} \quad (7)$$

In this way, the operation of the transformer as a current power supply is reversible. It is possible to control I1 by U2 and I2 by U1 in a configuration in which the pairs U1/I1 and U2/I2 are in phase, i.e., with a resistive dipole behavior.

It will also be noted that the weak coupling makes it possible to limit the constraints regarding the sinusoidal nature of the currents I1 and I2. It is thus possible to limit the conversion stages for the first and second converters 10, 30.

The second coil L2 is connected to the second converters 30. The second converter, so as to allow the connection of the second coil to the electric grid 3, includes four switches S5, S6, S7, S8 and two capacitances Cpos, Cneg mounted in parallel with the switches S5, S6, S7, S8.

The switches S5, S6, S7, S8 of the second converters 30 are arranged so as to allow a connection of the second coil L2 with the electric grid 3 when the switches S5, S7 are closed and the switches S6, S8 are open and to isolate the electric grid 3 from the second coil L2 when the switches S5, S7 are open and the switches S6, S8 are closed.

In order to obtain such an arrangement, the second coil L2 is connected to the electric grid by means of switches S55 and S7 with placement in parallel with the two capacitors Cpos, Cneg. The switches S6, S8 connect the two terminals of the second coil L2 so as to short-circuit it. In the configuration illustrated in FIG. 2, without this being necessary for the operation of the electric circuit 1, the shared terminal of the switches S8, S6 is connected to the shared terminal between the capacitors Cneg, Cpos.

The switching cells S5/S6 and S8/S7 are connected head to tail. If these switching cells S5/S6 and S8/S7 are polarized, then their negative terminals are connected to one another or their positive terminals are connected to one another.

The electric grid 3 is connected to the switches S5, S7 and to the capacitors Cneg, Cpos through the inductance Lac so as to filter part of the noise at the residual frequency f0 of the conversion provided by the second converters 30. The choice of the positioning of Lac is not restricted; it can be positioned between S7 and the electric grid or be split into two inductances connecting S5 to the electric grid 3 for the first and S7 to the electric grid for the second.

The command of the switches S5, S6, S7, S8 is done independently of the state of the voltage of the electric grid and the current in the second coil L2, i.e., the second converter operates in an open loop.

Thus, the switches S5, S6, S7, S8 form a switching regulator system suitable for providing the second coil L2 with an AC voltage with fundamental frequency f0 and proportional to the voltage of the electric grid resulting from a low-pass filter, the command of said switching regulator system being independent of the state of the voltages of the electric grid 3 and the electrical equipment 2.

In this way, for a period of $$T = \frac{1}{f0},$$

the command of the switches S5, S6, S7, S8 can be summarized as follows:

for 0<t<½T, S55 and S7 closed and S6 and S8 open,
for ½T<t<T, S55 and S7 open and S6 and S8 closed.

Thus, in the configuration with S5 and S7 closed and S6 and S8 open, and considering equations (2) to (7) of the transformer 20 previously described, in particular equation (7), it may be deduced that:

$$I1(t) = \frac{Vac(t)}{M\omega_O} \cdot \frac{2}{\pi} \cdot \sin\left(\omega_O \cdot t - \frac{\pi}{4}\right) \quad (8)$$

The voltage Vac(t) being able to be written as follows Vac(t)=Vac·sin(ω₂·t), equation (8) can be written:

$$I1(t) = \frac{Vac}{M\omega_O} \cdot \frac{2}{\pi} \cdot \sin\left(\omega_0 \cdot t - \frac{\pi}{4}\right) \cdot \sin(\omega_2 \cdot t) \quad (9)$$

Figure 4A:
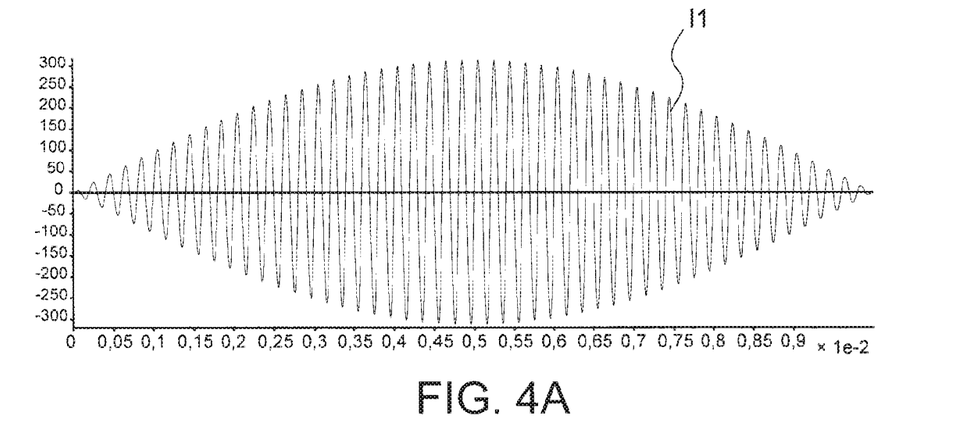

In this way, the transformer 20 operates as a current power supply applying a current I1 where of the amplitude is proportional to Vac with a modulation frequency f0. It is the latter current that is illustrated in FIG. 4A.

Figure 4B:
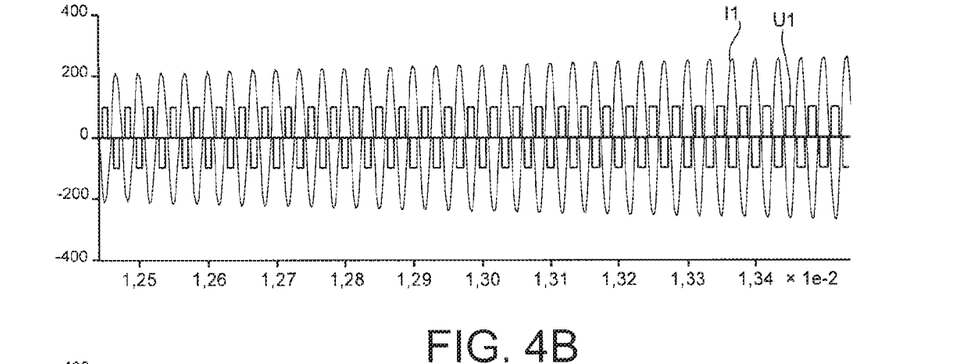
Figure 4C:
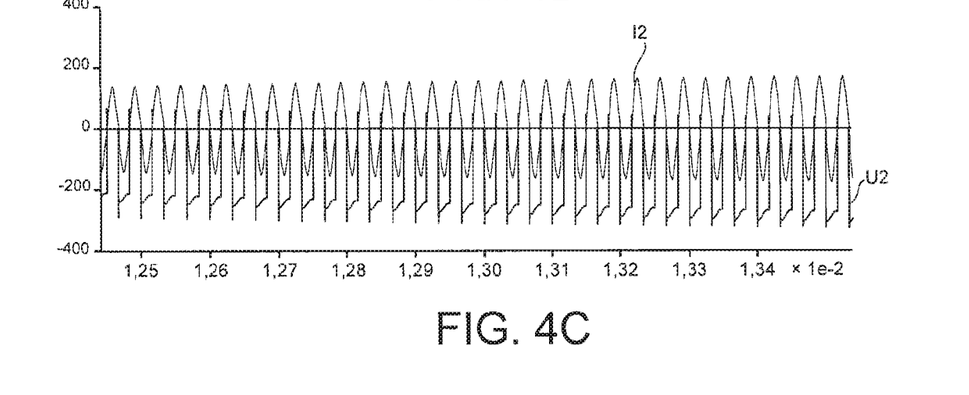

With the first converter 10 and its switches S1, S2, S3, S4, the phase of the voltage U1 relative to the current I1 can be controlled. Yet, as shown by equation (4) previously introduced, the current I2 is proportional to U2 with a phase shift of π/4. Thus, if U1 is controlled so that it is in phase opposition with I1 as illustrated in FIG. 4B, the modulation of the voltage U1 makes it possible to control the amplitude of the current I2 and obtain a zero phase shift between the current I2 and the voltage U2. The amplitude of the current Iac therefore results from the amplitude of the current I2, the voltage U2 being in phase with I2, as illustrated in FIG. 4C, and the capacitors Cpos, Cneg associated with the inductance Lac acting as a low-pass filter. It will be noted that with such a command of the switches S1, S2, S3, S4, the switching of the switches S5, S6, S7, S8 takes place at 0 current and therefore with very low losses.

It is therefore possible, with such an electric transformation circuit, to control the current Iac in the electric grid 3.

Furthermore, the circuit illustrated in FIG. 3 being bidirectional, according to a similar principle, it is possible to supply an electrical equipment 2 of the electric charge type with the electric grid 3. To that end, it suffices to control the voltage U1 so that it is in phase with I1 to operate as a generator with respect to the grid, or to control the voltage U1 so that it is in phase opposition with I1 to operate as a charge with respect to the grid.

One can also see that, since the current I1 depends on U2 and I2 depends on U1, it is possible, by equipping the electric circuit 1 with measuring systems, for only one side of the electrical equipment 2 to know the state of the electric current 1 on the side of the electric grid 3.

Figure 5:
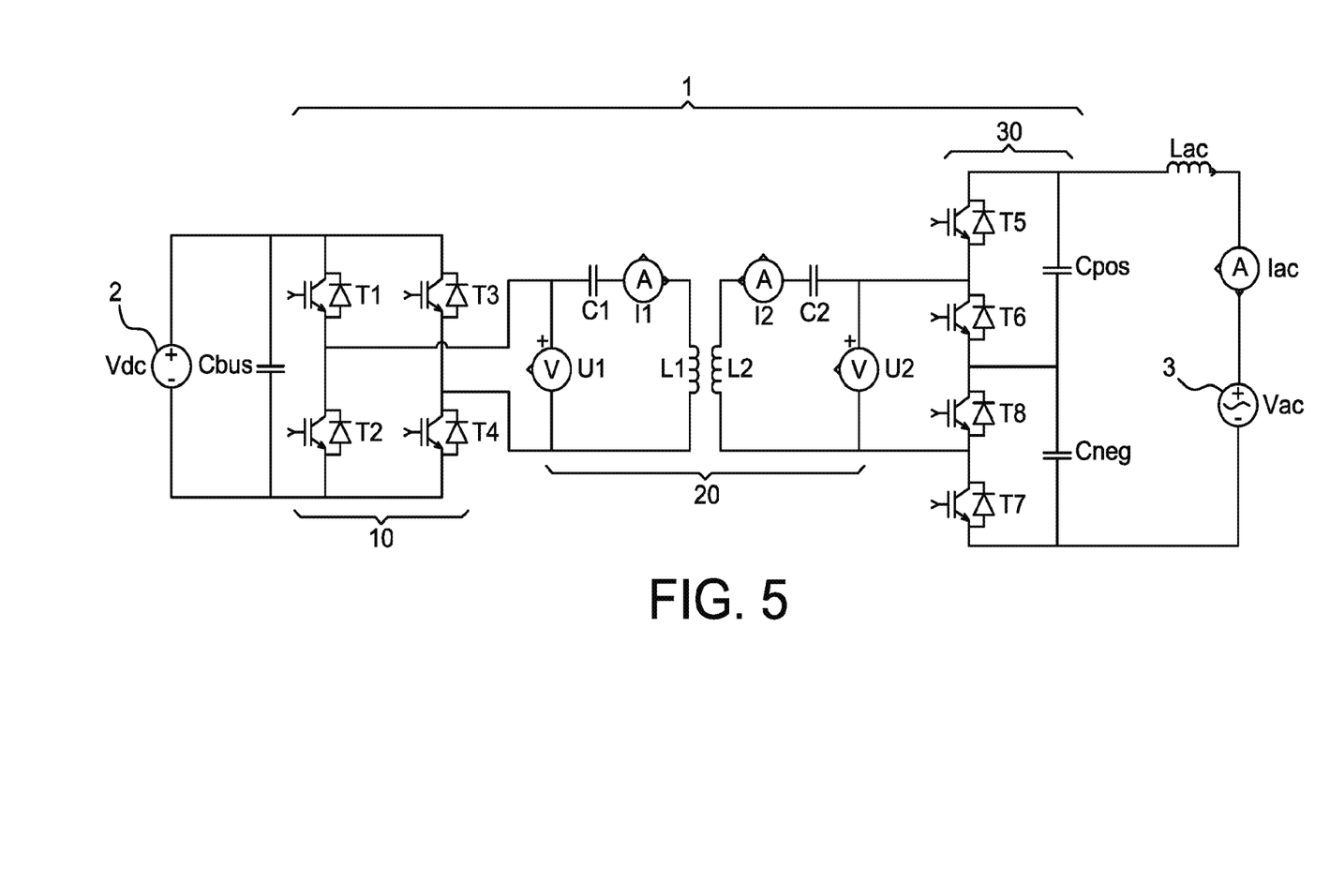
FIG. 5 illustrates a diagrammatic example embodiment of the electric circuit of FIG. 2, FIG. 6 diagrammatically illustrates an alternative of the electric circuit of FIG. 2 in which the electric circuit is a DC circuit, FIG. 7 diagrammatically illustrates an AC configuration for the second converter equipping the circuit illustrated in FIG. 2.

FIG. 5 diagrammatically illustrates an example embodiment of the circuit 1 according to the invention in which each switch S1, S2, S3, S4, S5, S6, S7, S8 is replaced by a an isolated gate bipolar transistor T1, T2, T3, T4, T5, T6, T7, T8, better known under its acronym IGBT, and a diode mounted in anti-parallel with respect to the IGBT. Such a use of an IGBT and a diode mounted together in an antiparallel configuration to operate as a switch being known by those skilled in the art, this configuration is not explained in more detail in this document. It should nevertheless be noted that with such a configuration, the frequency f0 can typically be set at a value of 15 kHz, thus offering a high transformation performance, despite potentially higher operating voltages of the switching cells T5/T6 and T7/T8 formed by the IGBT/diode T5, T6, T7, T8 pairs.

Figure 6:
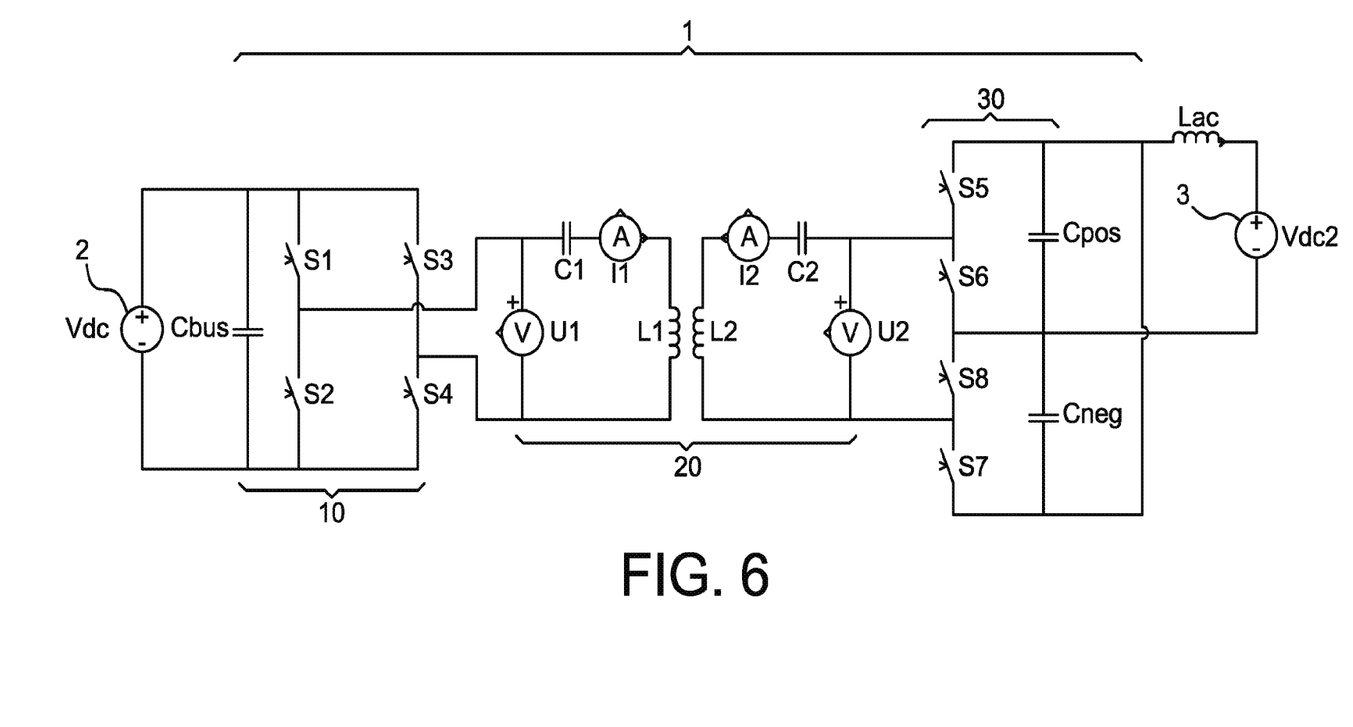

FIG. 6 illustrates an example circuit 1 according to the invention in which the electric grid 3 is a DC grid. The circuit 1 according to this example embodiment differs from the circuit 1 illustrated in FIG. 2 in that the electric grid 3 is connected in parallel with the capacitances Cpos and Cneg. In the case of FIG. 6, the connection assumes that if the switching cells S5/S6 and S7/S8, formed by the switches S5, S6, S7, S8, are polarized, they are connected to one another by their negative terminals.

In this way, for an electrical equipment 1 that is an electricity power supply, the polarized electric grid is powered by a current or voltage with the same polarity. In that way, with such a connection, the electric grid is powered or charged by a current made substantially direct by the filter formed by the capacitance Cpos, Cneg and the inductance Lac, depending on whether the transfer of power with the equipment 1 is positive or negative.

Likewise, when the electrical equipment 2 is a charge or an uncontrolled electric power supply, the electric circuit 1 makes it possible to adapt the voltage value experienced by the electrical equipment, using a principle similar to that explained for the circuit illustrated in FIG. 2.

According to one alternative of this embodiment, not illustrated, the second converter 30 may include, according to a principle similar to that of the first converter 10, a switching circuit comprising four four-quadrant switches so as to allow an adaptation between the DC voltage of the electric grid and the AC voltage with frequency f0 of the transformer 20. In this way, the DC voltage supplied by the electric grid 3 can be cut to provide the second coil L2 with an AC voltage with frequency f0, with an amplitude still proportional to Vac, as previously explained.

Figure 7:
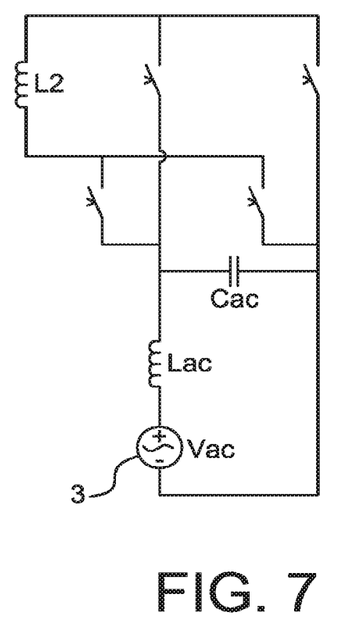

FIG. 7 illustrates an alternative of the second converter 20 illustrated in FIG. 2. The switches of such a second converter 20 according to this alternative may be commanded in the same way as the switches S5, S6, S7, S8 so as to allow, in a first position, a connection of the second coil L2 with the electric grid 3 and, in a second position, to isolate the electric grid 3 from the second coil L2. It may be noted that in such an alternative, a single capacitor Cac is implemented.

The invention claimed is:

1. An electric transformer circuit for connecting electrical equipment to an electric grid, said electric transformer circuit comprising:
a first voltage converter configured to connect the electrical equipment to a part of the electric transformer circuit operating with a first AC voltage having a frequency f0;
a transformer connected to the first voltage converter and configured to perform an amplitude adaptation between a voltage associated with the electrical equipment and a voltage associated with the electric grid, the transformer including a first coil connected to the first voltage converter and a second coil magnetically coupled to the first coil, the first and second coils being arranged secured in movement, the transformer forming the part of the electric transformer circuit working with the first AC voltage having the frequency f0; and
a second voltage converter configured to connect the second coil to the electric grid,
wherein the magnetic coupling between the first coil and the second coil is less than 0.7,
wherein the electric transformer circuit further comprises:
a first circuit that consists of the first coil of the transformer and a first capacitor associated with the first coil, the first circuit being configured to resonate at the frequency f0; and
a second circuit that consists of the second coil of the transformer and a second capacitor associated with the second coil, the second circuit being configured to resonate at the frequency f0,
wherein the second voltage converter includes a first switch, a second switch, a third switch, and a fourth switch arranged such that the second coil is connected to the electric grid when the first switch and the second switch are closed and the third switch and the fourth switch are open, and such that the electric grid is isolated from the second coil when the first switch and the second switch are open and the third switch and the fourth switch are closed, and
wherein respective commands for each of the first switch, the second switch, the third switch, and the fourth switch are independent of a state of the voltage associated with the electric grid and a current in the second coil.

2. The electric transformer circuit according to claim 1, wherein the transformer is an air transformer.

3. The electric transformer circuit according to claim 1, wherein the frequency f0 is greater than 1 kHz.

4. The electric transformer circuit according to claim 1,
wherein the electrical equipment works with a DC voltage based on an electric charge from a battery, and
wherein the first voltage converter is an AC to DC voltage converter with the transformer at an input and the electrical equipment at an output.

5. The electric transformer circuit according to claim 1,
wherein the electrical equipment works with a DC voltage from a renewable energy-based generator configured to supply electric power, and wherein the first voltage converter is an inverter with the electrical equipment at an input and the transformer at an output.

6. The electric transformer circuit according to claim 1, wherein the electrical equipment works with a DC voltage based on one of an electric charge and an electric power supply from a battery adapted to transmit energy to the electric grid, and
wherein the first voltage converter is an AC voltage to DC voltage bidirectional converter.

7. The electric transformer circuit according to claim 1, wherein the electrical equipment includes a battery configured to output an electric charge,
wherein the electric grid is an AC electric grid configured to output the voltage associated with the electric grid at a frequency f2,
wherein the second voltage converter is adapted to convert the voltage associated with the electric grid with the frequency f2 into a second AC voltage with the frequency f0, and
wherein the second voltage converter is connected at an input to the electric grid and at an output to the second coil.

8. The electric transformer circuit according to claim 7, wherein the second voltage converter includes a switching regulator system configured to provide the second coil with the second AC voltage with the frequency f0 as a fundamental frequency and proportional to a voltage of the electric grid resulting from a low-pass filter, a command of the switching regulator system being independent of the state of the voltage associated with the electric grid and the voltage associated with the electrical equipment.

9. The electric transformer circuit according to claim 1, wherein the electrical equipment includes a renewable energy-based generator as an electric power supply,
wherein the electric grid is an AC electric grid configured to output the voltage associated with the electric grid at a frequency f2,
wherein the second voltage converter is configured to convert a second AC voltage with the frequency f0 into a voltage with the frequency f2, and
wherein the second voltage converter is connected at an input to the second coil and at an output to the electric grid.

10. The electric transformer circuit according to claim 9, wherein the second voltage converter includes a switching regulator system configured to provide the second coil with the second AC voltage with the frequency f0 as a fundamental frequency and proportional to a voltage of the electric grid resulting from a low-pass filter, a command of the switching regulator system being independent of the state of the voltage associated with the electric grid and the voltage associated with the electrical equipment.

11. The electric transformer circuit according to claim 1, wherein the electrical equipment includes a battery configured to transmit energy to the electric grid as one of an electric charge and an electric power supply,
wherein the electric grid is an AC electric grid configured to output the AC voltage associated with the electric grid at a frequency f2, and
wherein the second voltage converter is configured to bidirectionally convert between a voltage with the frequency f2 associated with the voltage associated with the electric grid and a second AC voltage with the frequency f0.

12. The electric transformer circuit according to claim 11, wherein the second voltage converter includes a switching regulator system configured to provide the second coil with the second AC voltage with the frequency f0 as a fundamental frequency and proportional to a voltage of the electric grid resulting from a low-pass filter, a command of the switching regulator system being independent of the state of the voltage associated with the electric grid and the voltage associated with the electrical equipment.

13. The electric transformer circuit according to claim 1, wherein the electrical equipment includes a battery configured to output an electric charge,
wherein the electric grid is an AC electric grid, and
wherein the second voltage converter is an inverter configured to provide, from the AC voltage associated with the electric grid, a second AC voltage with the frequency f0 to the second coil.

14. The electric transformer circuit according to claim 13, wherein the second voltage converter includes:
a switching regulator system arranged to connect the electric grid and the second coil only during positive alternations of the second AC voltage with the frequency f0, and
a low-pass filter configured to at least partially filter the second AC voltage with the frequency f0.

15. The electric transformer circuit according to claim 1, wherein the electrical equipment includes a renewable energy-based generator configured to supply electric power,
wherein the electric grid is an AC electric grid,
wherein the second voltage converter is a converter configured to convert a second AC voltage with the frequency f0 into a DC voltage, and
wherein the second voltage converter is connected at an input to the second coil and at an output to the electric grid.

16. The electric transformer circuit according to claim 15, wherein the second voltage converter includes:
a switching regulator system arranged to connect the electric grid and the second coil only during positive alternations of the second AC voltage with the frequency f0, and
a low-pass filter configured to at least partially filter the second AC voltage with the frequency f0.

17. The electric transformer circuit according to claim 1, wherein the electrical equipment includes a battery configured to provide one of an electric charge and an electric power supply to transmit energy to the electric grid,
wherein the electric grid is an AC electric grid, and
wherein the second voltage converter is configured to bidirectionally convert a DC voltage into a second AC voltage with the frequency f0.

18. The electric transformer circuit according to claim 17, wherein the second voltage converter includes:
a switching regulator system arranged to connect the electric grid and the second coil only during positive alternations of the second AC voltage with the frequency f0, and
a low-pass filter configured to at least partially filter the second AC voltage with the frequency f0.

19. An electric installation comprising:
the electrical equipment configured to operate as one of an energy-based generator and an energy storage system, and
an electric device removably connectable to the electrical equipment, the removable electric device including the electric transformer circuit according to claim 1, wherein the electric device being configured to electrically connect the electrical equipment to the electric grid.

20. An electric transformer circuit for connecting electrical equipment having an equipment voltage to an electric grid having a grid voltage, the electric transformer circuit comprising:

a first voltage converter having first terminals connected to the electric grid and second terminals, the first voltage converter being configured to perform a reversible conversion between the grid voltage on the first terminals and a first AC voltage having a frequency f0 on the second terminals;

a transformer having third terminals and fourth terminals, the third terminals being connected to the second terminals, the transformer being configured to perform an amplitude adaptation between the first AC voltage having an amplitude of the grid voltage and a second AC voltage on the fourth terminals, the second AC voltage having an amplitude of the equipment voltage, the transformer including a first coil connected to the third terminals and a second coil connected to the fourth terminals, the second coil being magnetically coupled to the first coil with a magnetic coupling between the first coil and the second coil is less than 0.7, the first coil and the second coil being arranged secured in movement;

a second voltage converter having fifth terminals and sixth terminals, the fifth terminals being connected to the fourth terminals, and the sixth terminals being connected to the electrical equipment, the second voltage converter being configured to reversibly convert the second AC voltage having a frequency f0 on the fifth terminals into the equipment voltage on the sixth terminals;

a first resonant circuit that consists of the first coil of the transformer and a first capacitor connected in series, the first resonant circuit being configured to resonate at the frequency f0; and a second resonant circuit that consists of the second coil of the transformer and a second capacitor connected in series, the second resonant circuit being configured to resonate at the frequency f0, wherein the first voltage converter includes a first switch, a second switch, a third switch, a fourth switch, a third capacitor, a fourth capacitor, and a third coil arranged such that the electric grid is connected to the third and the fourth capacitor and to the first coil through the third coil when the first switch and the second switch are closed and the third switch and the fourth switch are open, and such that the electric grid is isolated from the first coil when the first switch and the second switch are open and the third switch and the fourth switch are closed, wherein respective commands for each of the first switch, the second switch, the third switch, and the fourth switch are independent of a state of the voltage associated with the electric grid and a current in the first coil, and wherein the second voltage converter includes a fifth capacitor in parallel with the electrical equipment, a fifth switch, a sixth switch, a seventh switch, and an eighth switch to connect the fifth capacitor and the electrical equipment to the second coil.

* * * * *